(12) United States Patent
Poissy et al.

(10) Patent No.: US 7,897,114 B2
(45) Date of Patent: Mar. 1, 2011

(54) MICROREACTOR ASSEMBLY INCORPORATING INTERCONNECT BACKBONE

(75) Inventors: Stephane Poissy, Brunoy (FR); Ronan Tanguy, Grez sur Loing (FR)

(73) Assignee: Corning Incorporated, Corning, NY (US)

( * ) Notice: Subject to any disclaimer, the term of this patent is extended or adjusted under 35 U.S.C. 154(b) by 261 days.

(21) Appl. No.: 12/340,878

(22) Filed: Dec. 22, 2008

(65) Prior Publication Data

US 2009/0162265 A1 Jun. 25, 2009

(30) Foreign Application Priority Data

Dec. 21, 2007 (EP) ................... 07305007

(51) Int. Cl.
*B01J 19/00* (2006.01)
(52) U.S. Cl. .............. 422/130; 422/129; 422/198; 422/200; 422/224; 422/240
(58) Field of Classification Search .............. 422/129, 422/130, 198, 200, 224, 240
See application file for complete search history.

(56) References Cited

U.S. PATENT DOCUMENTS

| 5,387,395 | A | 2/1995 | Coassin et al. ............... 422/81 |
| 6,645,432 | B1 | 11/2003 | Anderson et al. ............ 422/100 |
| 6,830,936 | B2 * | 12/2004 | Anderson et al. ............ 436/180 |
| 6,848,462 | B2 | 2/2005 | Covington et al. ....... 137/15.01 |
| 6,919,046 | B2 | 7/2005 | O'Connor et al. ........... 422/100 |
| 6,994,245 | B2 | 2/2006 | Pinchot ...................... 228/254 |
| 7,004,198 | B1 * | 2/2006 | Okandan et al. ............ 137/827 |
| 7,172,735 | B1 | 2/2007 | Lowe et al. .................. 422/188 |
| 7,247,276 | B2 | 7/2007 | Schuppich et al. ........... 422/129 |
| 2003/0134734 | A1 * | 7/2003 | Nishimoto et al. ............ 501/69 |
| 2004/0179980 | A1 | 9/2004 | Pattekar et al. ............... 422/130 |
| 2004/0228771 | A1 | 11/2004 | Zhou et al. ................... 422/102 |
| 2006/0051260 | A1 | 3/2006 | Yagi et al. ................... 422/198 |
| 2007/0053808 | A1 | 3/2007 | Markowz et al. ............ 422/222 |
| 2007/0261750 | A1 * | 11/2007 | Nedelec ..................... 137/833 |

FOREIGN PATENT DOCUMENTS

| WO | WO 2005/096751 A1 * | 10/2005 |
| WO | WO2006/015308 | 2/2006 |
| WO | WO2006/097307 | 9/2006 |
| WO | WO2007/016931 | 2/2007 |
| WO | WO2007/036513 | 4/2007 |

* cited by examiner

*Primary Examiner*—Walter D Griffin
*Assistant Examiner*—Natasha Young
(74) *Attorney, Agent, or Firm*—Gregory V. Bean

(57) ABSTRACT

A microreactor assembly comprising a fluidic interconnect backbone and plurality of fluidic microstructures is provided. The fluidic microstructures are supported by respective portions of the fluidic interconnect backbone, The microreactor assembly comprises a plurality of non-polymeric interconnect seals associated with the interconnect input and output ports. The interconnect input port of the fluidic interconnect backbone is interfaced with the microchannel output port of a first fluidic microstructure at one of the non-polymeric interconnect seals. The interconnect output port of the fluidic interconnect backbone is interfaced with the microchannel input port of a second fluidic microstructure at another of the non-polymeric interconnect seals. The interconnect microchannel is defined entirely by the fluidic interconnect backbone and is configured such that it extends from the non-polymeric interconnect seal at the microchannel output port of the first fluidic microstructure to the non-polymeric interconnect seal at the microchannel input port of the second fluidic microstructure without interruption by additional sealed interfaces.

18 Claims, 1 Drawing Sheet

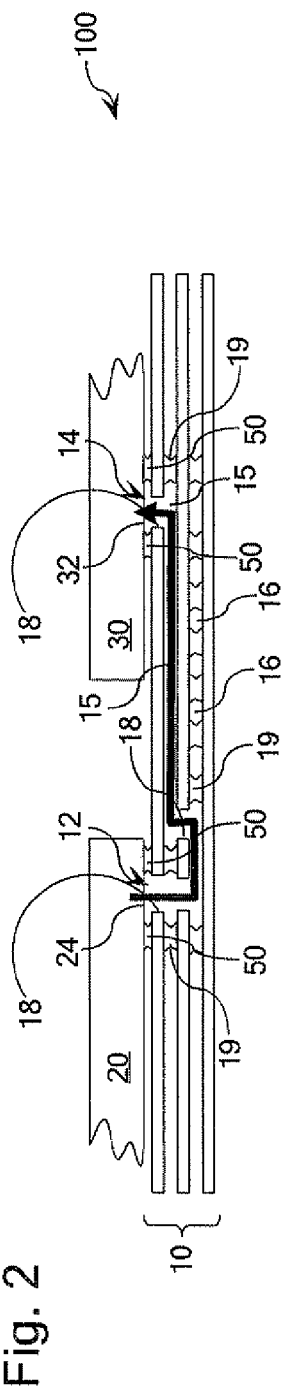
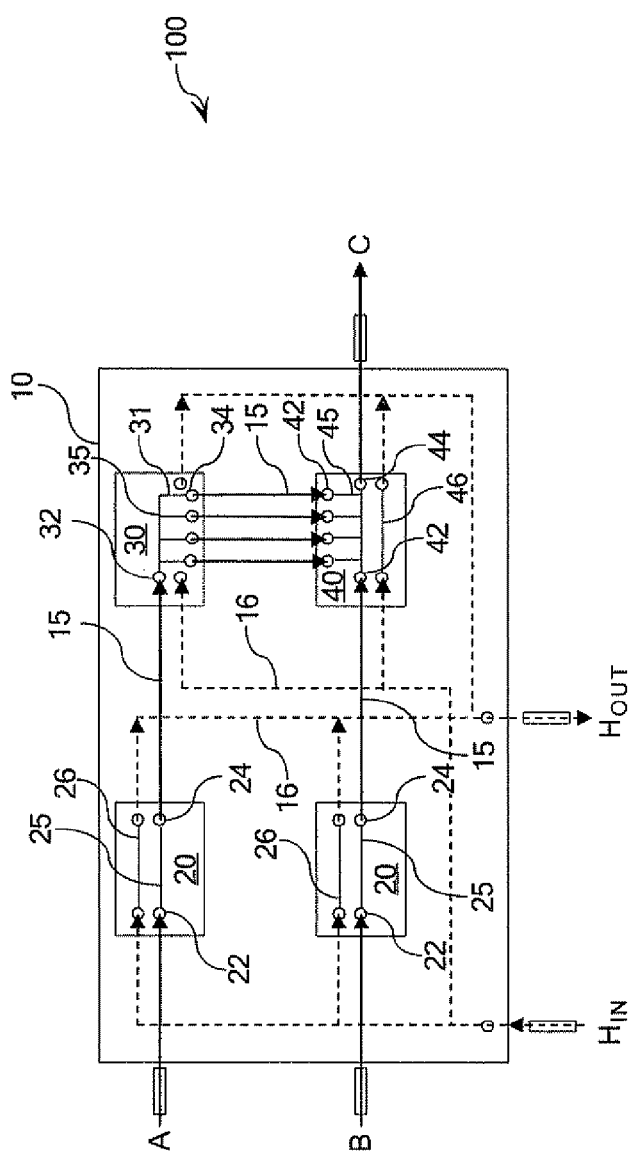

MICROREACTOR ASSEMBLY INCORPORATING INTERCONNECT BACKBONE

PRIORITY

This application claims priority to European Patent Application number 07305007.2, filed Dec. 21, 2007, titled "Microreactor Assembly Incorporating Interconnect Backbone".

BACKGROUND

The present invention relates to microreactor technology. Microreactors are commonly referred to as microstructured reactors, microchannel reactors, or microfluidic devices. Regardless of the particular nomenclature utilized, the microreactor is a device in which a moving or static target sample is confined and subject to processing. In some cases, the processing involves the analysis of chemical reactions. In others, the processing is executed as part of a manufacturing process utilizing two distinct reactants. In either case, the dimensions of the confined space are on the order of about 1 mm. Microchannels are the most typical form of such confinement and the microreactor is usually a continuous flow reactor, as opposed to a batch reactor. The reduced internal dimensions of the microchannels provide considerable improvement in mass and heat transfer rates. In addition, microreactors offer many advantages over conventional scale reactors, including vast improvements in energy efficiency, reaction speed, reaction yield, safety, reliability, scalability, etc.

Microreactors are often employed to introduce two separate reactants into a common microchannel network. Typically, the microchannel network and the associated components for directing the reactants to the proper microchannels within the network are fairly complex and need to be configured for operation under high temperatures and pressures. As a result, conventional microreactor configurations, such as that disclosed in published international patent application WO-2007-036513 employ a variety of fluidic ducts, fittings, adapters, O-rings, screws, clamps, and other types of connection elements to interconnect various microstructures within the microreactor configuration. Each of these elements increases the complexity of the system and is a potential source of leakage or other error within the system. The present invention relates generally to the design of a microreactor assembly that reduces the use of many of the aforementioned components and, as such, addresses these design issues.

BRIEF SUMMARY OF INVENTION

According to one embodiment of the present invention, a microreactor assembly comprising a fluidic interconnect backbone and plurality of fluidic microstructures is provided. The fluidic microstructures are supported by respective portions of the fluidic interconnect backbone. The microreactor assembly comprises a plurality of non-polymeric interconnect seals associated with the interconnect input and output ports. The interconnect input port of the fluidic interconnect backbone is interfaced with the microchannel output port of a first fluidic microstructure at one of the non-polymeric interconnect seals. The interconnect output port of the fluidic interconnect backbone is interfaced with the microchannel input port of a second fluidic microstructure at another of the non-polymeric interconnect seals. The interconnect microchannel is defined entirely by the fluidic interconnect backbone and is configured such that it extends from the non-polymeric interconnect seal at the microchannel output port of the first fluidic microstructure to the non-polymeric interconnect seal at the microchannel input port of the second fluidic microstructure without interruption by additional sealed interfaces.

The following detailed description of specific embodiments of the present invention can be best understood when read in conjunction with the following drawings, where like structure is indicated with like reference numerals and in which:

BRIEF DESCRIPTION OF FIGURES

FIG. 1 is a schematic illustration of a microreactor assembly according to one embodiment of the present invention; and FIG. 2 is a detailed schematic illustration of a portion of the microreactor assembly illustrated in FIG. 1.

DESCRIPTION

Referring to FIGS. 1 and 2, a microreactor assembly 100 according to one embodiment of the present invention is illustrated. The microreactor assembly 100 comprises a fluidic interconnect backbone 10 and plurality of fluidic microstructures 20, 30, 40. Although the present invention is not limited to the use of specific types of fluidic microstructures, in the illustrated embodiment, reactants A and B are initially direct through respective thermal exchange microstructures 20 to help regulate the temperature of the reactants. The first reactant A is then routed through a reactant distribution microstructure 30, where the fluid flow path of reactant A is distributed across a plurality of reactant flow paths 31. Each of these reactant flow paths 31 is subsequently directed to a mixing microstructure 40, where the reactants A and B are permitted to react.

As is noted above, the specific fluidic microstructure configuration illustrated in FIG. 1 should not be interpreted to limit the scope of the present invention. Rather, the selected microstructures illustrated in FIG. 1 serve the general purpose of illustrating that microreactor assemblies according to the present invention can utilize the fluidic interconnect backbone 10 to support and operatively interconnect a variety of fluidic microstructures 100, including, but not limited to, those illustrated in FIG. 1.

Referring collectively to FIGS. 1 and 2, each of the fluidic microstructures 20, 30, 40 comprises a plurality of fluidic microchannels 25, 35, 45 comprising respective microchannel input ports 22, 32, 42 and microchannel output ports 24, 34, 44. Similarly, the fluidic interconnect backbone 10 comprises corresponding interconnect microchannels 15, each of which comprises an interconnect input port 12 and an interconnect output port 14. The microreactor assembly 100 also comprises a plurality of non-polymeric interconnect seals 50 associated with the interconnect input and output ports 12, 14.

As is clearly illustrated in FIG. 2, the interconnect input port 12 of the fluidic interconnect backbone 10 is interfaced with the microchannel output port 24 of a first fluidic microstructure 20 at one of the non-polymeric interconnect seals 50. Similarly, the interconnect output port 14 of the fluidic interconnect backbone 10 is interfaced with the microchannel input port 32 of a second fluidic microstructure 30 at another of the non-polymeric interconnect seals 50. The interconnect microchannel 15 is defined entirely by the fluidic interconnect backbone 10 and is configured such that it extends from the non-polymeric interconnect seal 50 at the microchannel output port 24 of the first fluidic microstructure to the non-polymeric interconnect seal 50 at the microchannel input port 32 of the second fluidic microstructure 30 without interruption by additional sealed interfaces. As a result, the microreactor assembly 100 utilizes the interconnect backbone 10 to provide a high performance connection between the fluidic microstructures—in terms of chemical resistance and operating pressure and temperature. The interconnect backbone 10 also simplifies the microreactor assembly 100 by drastically decreasing the number of external connections between microstructures and the associated securing and sealing hardware.

Further, the interconnect backbone 10 can improve process control in microreactor assemblies because it also incorporates thermal interconnect microchannels 16. More specifically, referring collectively to FIGS. 1 and 2, the fluidic microstructures 20, 30, 40 may each comprise thermal fluid microchannels 26, 46 configured for thermal exchange between a reactant fluid in the fluidic microchannels 25, 35, 45 and a thermal fluid in the thermal fluid microchannels 26, 46. Similarly, the interconnect microchannels 15 may comprise thermal interconnect microchannels 16 dedicated to the thermal fluid microchannels 26, 46 of the fluidic microstructures 20, 30, 40 via corresponding non-polymeric interconnect seals.

As is illustrated in FIG. 2, the fluidic interconnect backbone 10 is configured as a multilayer manifold comprising a network of cross-layer openings 18 and intra-layer blockages 19 configured to segregate individual layers of the multilayer manifold into a plurality of independent interconnect microchannels. As a result, the fluidic interconnect backbone 10 can be configured to complement a variety of fluidic microstructures of varying complexity. The respective positions of the cross-layer openings 18 can be selected such that the interconnect input and output ports 12, 14 complement standard I/O patterns of a variety of microfluidic structures or customized I/O patterns of highly specialized applications.

As will be appreciated by those familiar with microreactor technology, the complexity of the reactant and thermal exchange microchannels illustrated herein can vary widely and has merely been illustrated in relatively simple schematic form in FIGS. 1 and 2. For the purposes of describing and defining the present invention, it is merely noted that the aforementioned interconnect and reactant microchannels 15, 25, 35, 45 serve to direct two or more reactants A, B to one or more common portions of the microreactor assembly 100 to facilitate reactions that will produce one or more reaction products C. The thermal fluid microchannels 16, 26, 46 utilize the circulation of a thermal fluid H to control the temperature of the microreactor assembly 100 and the various fluid circulating therein. It is contemplated that, in particular embodiments of the present invention, the temperature of the input thermal fluid $H_{IN}$ can be varied between predetermined values to facilitate operation in different modes or under different conditions.

The interconnect seals 50 are selected to be non-polymeric for improved performance at relatively high or relatively low operating temperatures, i.e., at temperatures wherein polymeric seals would fail or degrade. In practicing the present invention, the non-polymeric interconnect seals 50 may be constructed in a variety of ways. For example, one or more of the non-polymeric interconnect seals 50 may comprise a sealed interface formed jointly by a material of one of the fluidic microstructures 20, 30, 40, a material of the fluidic interconnect backbone 10, and an intervening non-polymeric bonding material. Alternatively, one or more of the non-polymeric interconnect seals 50 may comprise a glass/glass sealed interface, which may be formed jointly by a glass of one of the fluidic microstructures 20, 30, 40 and a glass of the fluidic interconnect backbone 50. According to another embodiment of the present invention, one or more of the non-polymeric interconnect seals 50 may comprise a glass/frit/glass sealed interface, which may be formed jointly by a glass of one of the fluidic microstructures 20, 30, 40, a glass of the fluidic interconnect backbone 10, and an intervening layer of glass frit. In another contemplated embodiment, one or more of the non-polymeric interconnect seals 50 may comprise a glass/ceramic sealed interface, which may be formed jointly by a glass or a ceramic of one of the fluidic microstructures 20, 30, 40 and a glass or a ceramic of the fluidic interconnect backbone 10. In yet another alternative, one or more of the non-polymeric interconnect seals 50 may comprise a ceramic/ceramic sealed interface, which may be formed jointly by a ceramic of one of the fluidic microstructures 20, 30, 40 and a ceramic of the fluidic interconnect backbone 10. In still another alternative, one or more of the non-polymeric interconnect seals 50 may comprises a glass/glass, a glass/ceramic, or a ceramic/ceramic sealed interface and an intervening non-polymeric bonding material.

It is noted that recitations herein of a component of the present invention being "configured" in a particular way, to embody a particular property, or function in a particular manner, are structural recitations as opposed to recitations of intended use. More specifically, the references herein to the manner in which a component is "configured" denote an existing physical condition of the component and, as such, are to be taken as a definite recitation of the structural characteristics of the component.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A microreactor assembly comprising a fluidic interconnect backbone and plurality of fluidic microstructures, wherein:

the fluidic microstructures are supported by respective portions of the fluidic interconnect backbone;

each of the fluidic microstructures comprises a plurality of fluidic microchannels comprising respective microchannel input ports and microchannel output ports;

the fluidic interconnect backbone comprises at least one interconnect microchannel comprising an interconnect input port and an interconnect output port;

the microreactor assembly comprises a plurality of non-polymeric interconnect seals associated with the interconnect input and output ports;

the interconnect input port of the fluidic interconnect backbone is interfaced with the microchannel output port of a first fluidic microstructure at one of the non-polymeric interconnect seals;

the interconnect output port of the fluidic interconnect backbone is interfaced with the microchannel input port of a second fluidic microstructure at one of the non-polymeric interconnect seals; and the interconnect microchannel is defined entirely by the fluidic interconnect backbone and is configured such that it extends from the non-polymeric interconnect seal at the microchannel output port of the first fluidic microstructure to the non-polymeric interconnect seal at the microchannel input port of the second fluidic microstructure without interruption by additional sealed interfaces.

2. A microreactor assembly as claimed in claim 1 wherein the fluidic interconnect backbone comprises a plurality of independent interconnect microchannels and is configured as a multilayer manifold comprising a network of cross-layer openings and intra-layer blockages configured to segregate individual layers of the multilayer manifold into the plurality of independent interconnect microchannels.

3. A microreactor assembly as claimed in claim 1 wherein the plurality of fluidic microstructures supported by the fluidic interconnect backbone comprise at least one reactant distribution microstructure and at least one mixing microstructure.

4. A microreactor assembly as claimed in claim 3 wherein the fluidic interconnect backbone comprises a plurality of interconnect microchannels configured to interface with corresponding fluidic microchannels of the reactant distribution and mixing microstructures via the non-polymeric interconnect seals.

5. A microreactor assembly as claimed in claim 4 wherein the plurality of fluidic microstructures further comprise at least one thermal exchange microstructure and the fluidic interconnect backbone comprises a plurality of interconnect microchannels configured to interface with corresponding fluidic microchannels of the thermal exchange microstructure.

6. A microreactor assembly as claimed in claim I wherein the fluidic microchannels of at least one of the fluidic microstructures comprise at least one reactant microchannel configured to direct a reactant fluid from a microchannel input port to a microchannel output port and at least one thermal fluid microchannel configured for thermal exchange between a reactant fluid in the reactant microchannel and a thermal fluid in the thermal fluid microchannel.

7. A microreactor assembly as claimed in claim 6 wherein:
the fluidic interconnect backbone comprises a plurality of interconnect microchannels;
one of the interconnect microchannels comprises a reactant interconnect microchannel dedicated to the reactant microchannels of the fluidic microstructures via the non-polymeric interconnect seals; and
another of the interconnect microchannels comprises a thermal interconnect microchannel dedicated to the thermal fluid microchannels of the fluidic microstructures via the non-polymeric interconnect seals.

8. A microreactor assembly as claimed in claim 7 wherein another of the interconnect microchannels comprises at least one additional reactant interconnect microchannel dedicated to additional reactant microchannels of the fluidic microstructures via the non-polymeric interconnect seals.

9. A microreactor assembly as claimed in claim 1 wherein at least one of the non-polymeric interconnect seals comprises a sealed interface formed jointly by a material of one of the fluidic microstructures, a material of the fluidic interconnect backbone, and an intervening non-polymeric bonding material.

10. A microreactor assembly as claimed in claim 1 wherein at least one of the non-polymeric interconnect seals comprises a glass/glass sealed interface.

11. A microreactor assembly as claimed in claim 10 wherein the glass/glass sealed interface is formed jointly by a glass of one of the fluidic microstructures and a glass of the fluidic interconnect backbone.

12. A microreactor assembly as claimed in claim 1 wherein at least one of the non-polymeric interconnect seals comprises a glass/frit/glass sealed interface.

13. A microreactor assembly as claimed in claim 12 wherein the glass/frit/glass sealed interface is formed jointly by a glass of one of the fluidic microstructures, a glass of the fluidic interconnect backbone, and an intervening layer of glass frit.

14. A microreactor assembly as claimed in claim 1 wherein at least one of the non-polymeric interconnect seals comprises a glass/ceramic sealed interface.

15. A microreactor assembly as claimed in claim 14 wherein the glass/ceramic sealed interface is formed jointly by a glass or a ceramic of one of the fluidic microstructures and a glass or a ceramic of the fluidic interconnect backbone.

16. A microreactor assembly as claimed in claim 1 wherein at least one of the non-polymeric interconnect seals comprises a ceramic/ceramic sealed interface.

17. A microreactor assembly as claimed in claim 16 wherein the ceramic/ceramic sealed interface is formed jointly by a ceramic of one of the fluidic microstructures and a ceramic of the fluidic interconnect backbone.

18. A microreactor assembly as claimed in claim 1 wherein:
at least one of the non-polymeric interconnect seals comprises a glass/glass, a glass/ceramic, or a ceramic/ceramic sealed interface; and
the sealed interface is formed jointly by a glass or ceramic of one of the fluidic microstructures, a glass or ceramic of the fluidic interconnect backbone, and an intervening non-polymeric bonding material.

* * * * *